United States Patent Office 2,904,950
Patented Sept. 22, 1959

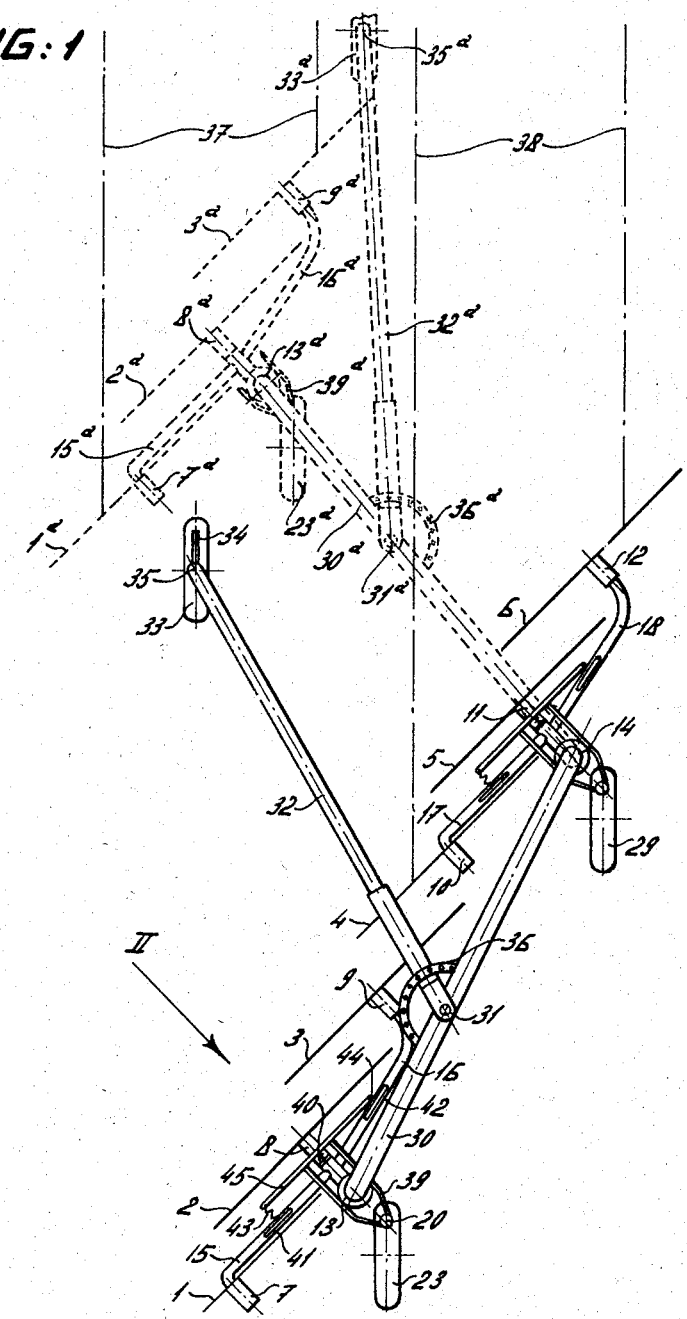
FIG: 1

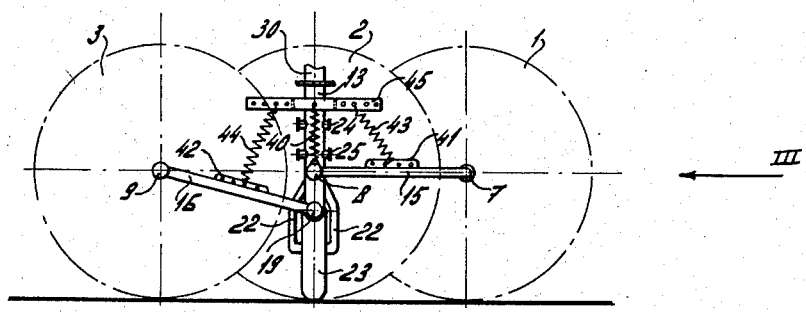
FIG: 2
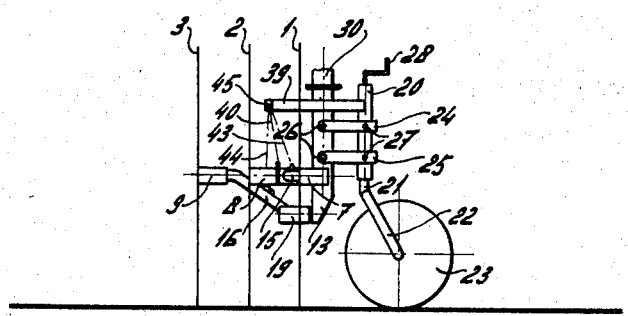
FIG: 3

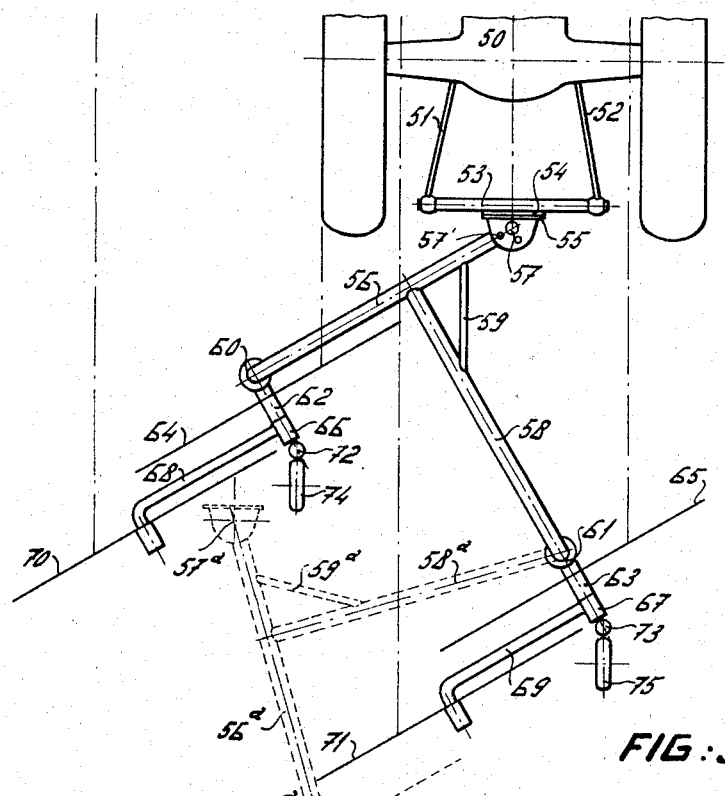
FIG: 4
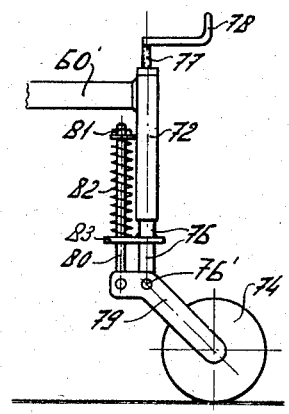
FIG: 5

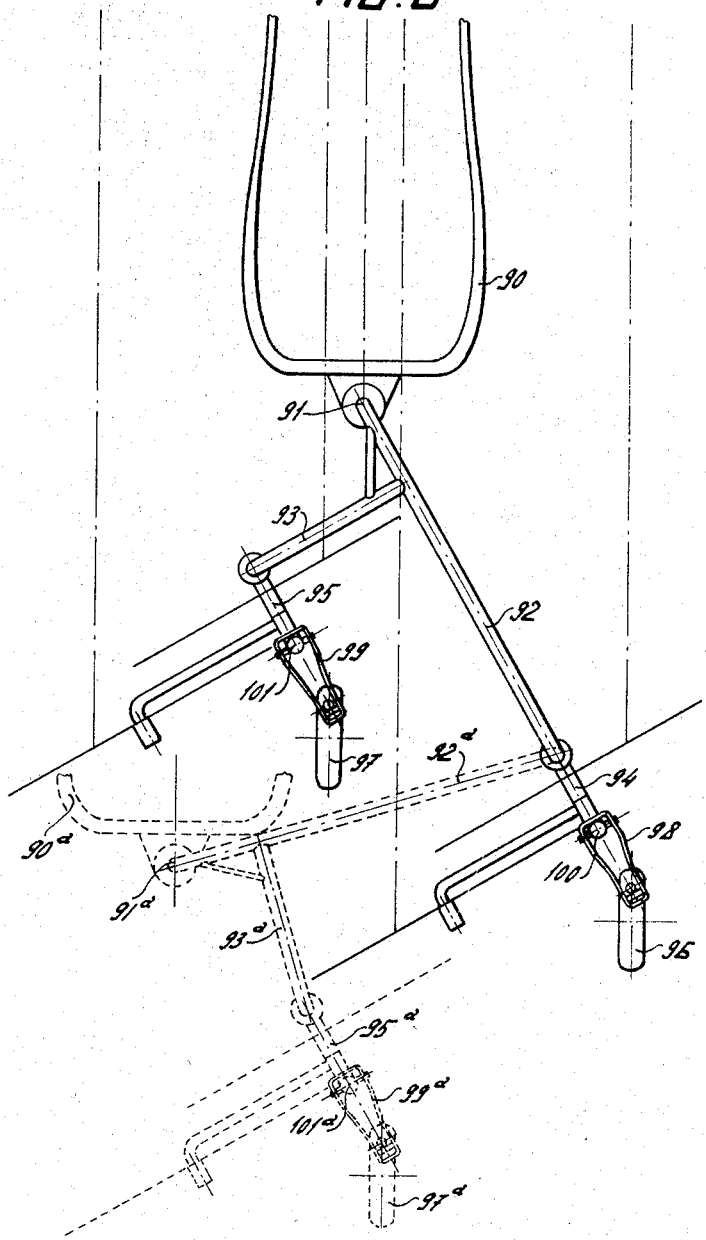

2,904,950
SIDE DELIVERY RAKING DEVICE

Cornelis van der Lely and Ary van der Lely, Maasland, Netherlands, assignors to C. van der Lely N.V., Maasland, Netherlands, a limited company of the Netherlands Application June 4, 1953, Serial No. 359,463

Claims priority, application Netherlands June 16, 1952

16 Claims. (Cl. 56—377)

This invention relates to a raking device, such as a side delivery rake or a swath turner, having rake wheels which are rotated by their coming into contact with the ground and arranged with their wheel planes at an angle to the direction of travel of the device.

It is an object of the present invention to provide a raking device of this kind in which the construction of the mobile frame carrying the rake wheels is extremely simplified and reduced in weight.

A further object of the invention is to provide a raking device of the above described character with at least one supporting structure of relatively small dimensions and light weight including a running wheel arranged in the vicinity of one of the rake wheels, said supporting structure comprising two parts which are resiliently connected together, the first of said parts being connected to the axis of the running wheel and the other of said parts being substantially rigidly connected to the frame and non-resiliently connected to the axis of said one rake wheel.

Another object of the invention is to arrange one or more other rake wheels in the proximity of the first mentioned rake wheel and to realize a movable connection between said other rake wheel or wheels and the supporting structure, in order that a group of rake wheels will have a common support sustained by a single running wheel and the rake wheels of said group will be resiliently mounted with regard to the ground.

A still further object of the invention is to interpose resilient means, such as upright springs, between the parts of the support and/or between said support and some of the rake wheels of the group.

It is also an object of the present invention to provide two supports as mentioned above, rigidly connected together and each carrying a group of resiliently mounted rake wheels.

Still other objects, features and details of the invention will appear from the following description with reference to the accompanying drawings in which some preferred embodiments of the raking device according to the invention have been shown by way of example and in which:

Fig. 1 shows a plan view of a raking machine adapted to be used as a side delivery rake and as a swath turner;

Figure 2 is a front elevational view of a group of rake wheels with a part of the frame in section;

Figure 3 is a side view of the structure of Figure 2, looking in the direction of the arrow III of Figure 2;

Fig. 4 shows a plan view of a side delivery rake and swath turner which is combined with a tractor;

Fig. 5 is a side elevation of the running wheel in the device shown in Fig. 4;

Fig. 6 shows a plan view of a side delivery rake and swath turner designed for animal traction.

In Fig. 1 the full lines represent the relative positions of the parts of a machine according to the invention for use as a side delivery rake, whilst the changed position, in which the machine is used as a swath turner, is indicated by dotted lines with the exception of the parts whose positions are unchanged. Parts in said changed position are always distinguished from those in the first mentioned position by addition of an "a" to the reference numbers. The machine comprises two groups of rake wheels, more particularly, the rake wheels 1–3 and the rake wheels 4–6. Each group of rake wheels is mounted on a supporting structure belonging respectively to a running wheel 23 and 29 of the device. The hub of the rake wheels are carried by axles 7, 8, 9, 10, 11 and 12, the axles 8 and 11 carrying the middle rake wheels 2 or 5 of a group (called the first rake wheel of the group) are directly connected to the supports 13 and 14 (Figs. 2 and 3), each forming part of the related one of the supporting structures. The axles of the other rake wheels of each group form crank pins of cranks or arms 15, 16 and 17, 18 respectively, which are rotatably connected to the supports 13 and 14, respectively. The crank 16 rotates about a pin 19 which is fixed to the support 13, below the axle 8, while the crank 18 is fixed to the support 14 in a similar manner. The cranks 15 and 17 are, however, rotatably arranged about the axles 8 and 11 beside the hubs of the rake wheels 2 and 5.

In Figs. 2 and 3 the construction of the supporting structure belonging to the running wheels 23 is clearly visible. Along side the illustrated support 13, which constitutes the second part of the supporting structure, is provided a vertical tube 20 into which a rod 21 has been introduced from the bottom end, said rod being rotatable within the tube 20 and bearing a fork 22 for the running wheel 23. Since the fork 22 is slanting, the axle of the running wheel 23 is situated behind the axis of rotation between the members 20 and 21, in consequence of which the running wheel 23 is self-adjusting. The members 20, 21 and 22 belong to the first part of the supporting structure.

Brackets 24 and 25 engage the tube 20 and the support 13 and are hingedly fixed thereto at hinge points 26 and 27. Since these hinge points 26 and 27 form the corners of a parallelogram, the axes of the parts 13 and 20 remain parallel during any relative movement of said parts. At the top of the tube 20 a threaded bush is inserted, in which a threaded rod can be screwed downwards and upwards by means of a handle 28. The top end of the rod 21 rests against the bottom end of said threaded rod, so that by means of this device the height of the tube 20 with regard to the running wheel may be adjusted.

The supports 13 and 14 are interconnected by a frame member formed in the shape of a bow 30 having downwardly turned ends, upon which the supports 13 and 14 are mounted so as to be pivotable above vertical axes, in order to enable the machine to be transformed from a side delivery rake into a swath turner. When the machine is used in one of these positions, however, any pivotal movement is rendered impossible, for instance by means of a locking pin. The bow 30 is connected at a point 31 to an arm 32 having a downwardly bent free end and carrying a running wheel 33, said arm 32 being adapted to swing in a substantially horizontal plane. The pivotal point 31 of the bow 30 is located at such an elevation that the arm 32 does not touch the rake wheels during any swinging movement.

The raking machine is adapted to be drawn by any suitable traction means connected to a hook 34 which is arranged for pivotal movement on a vertical axis 35 and which causes corresponding pivotal movement of the running wheel 33 during such pivotal movement. In each position of use the arm 32 is locked with respect to the bow shaped frame member 30 by means of a pin passing through the arm 32 and through one of the openings in an arc or tangent member 36 which is rigidly secured to the frame member 30. In the position as a swath turner the running wheel 23a is disposed to roll over the ground between the swaths 37 and 38 to be turned.

For obtaining the desired resiliency between the first part (members 20 and 21) and the second part (support 13) of the supporting structure, a bracket 39 surrounding the support 13 is rigidly fixed to the top end of the tube 20. Between a suitable point of this bracket and the axle 8 of the first rake wheel 2 a spring 40 is arranged. Furthermore strips 41 and 42 provided with openings are arranged upon the cranks 15 and 16. Springs 43 and 44 are hooked into the openings of the strips 41 and 42 to considerably relieve the pressure of the other rake wheels 1 and 3 on the ground. In order that sagging of the rake wheels 1 and 3 will not also affect the rake wheel 2 too much, the springs 43 and 44 are not fixed to the support 13, but rather to the bracket 39 or to a transverse rod 45 fixed to said bracket. By such an arrangement, the greater part of the weight of the rake wheels 1 and 3 will be transmitted to and carried by the wheel 23 without extremely loading the spring 40.

Arrangement of the springs 43 and 44 with the top ends thereof at a large distance from the support 13 is desirable in that upon sagging of the rake wheel 1 or 3 the effective length of the arm upon which the spring acts cannot easily be decreased to such an amount that the wheel can not be lifted by the spring. When the springs 43 and 44 are arranged in a definite manner, the point of attachment to the strips 41 and 42 being especially of importance, the springs 43 and 44 will aid in suspending the support 13 from the parts which are not resiliently mounted and are connected to the wheel 23, to such an extent that the spring 40 may be omitted. When in raking on a given terrain it appears that the wheel pressure of the rake wheels is too low for perfect raking, the handle 28 may be turned so that the tube 20 is lowered, whereby the tension in the springs 43, 44 and 40 decreases and the wheel pressure increases to the same extent.

The device shown in Fig. 4 comprises a tractor 50 which is combined with a side delivery rake and swath turner. In this case the position of the machine as a swath turner is indicated by full lines and the parts which are displaced for the transformation of the device into a side delivery rake are shown in their displaced positions by dotted lines and there indicated by the addition of an "a" to the reference numerals.

The tractor 50 carries a number of rearwardly extending rods, such as the rods 51 and 52 which are interconnected by a rod 53. In the centre of the rod 53 is arranged a coupling, the parts 54 and 55 of which are rotatable with regard to each other about an axis lying in the direction of movement of the tractor. The part 54 is fixed to the rod 53 and the part 55 is hingedly connected to a tube or arm 56 which is bent upwards. In the working position the hinge axis 57 between part 55 and tube 56 is practically vertical. By means of a pin 57' the arm 56 may be fixed with regard to the part 55 of the coupling 54, 55 in a selected one of a number of positions. To the tube 56 is welded a tube 58 and the angular position of these tubes is secured by a strut 59. The free ends 60 and 61 of the tubes 56 and 58 are bent vertically downwards in the working position and carry short extensions 60', one of which is shown in Figure 5 which are rotatable about vertical axes and may be locked in position by a pin, not shown, that will prevent relative rotation of parts 60 and 60', the horizontal axles being fixed to said extensions. The hubs 62 and 63 of rake wheels 64 and 65 as well as bushes 66 and 67 are rotatable about their supporting axles, not shown. Said bushes carry cranks 68 and 69 and the rake wheels 70 and 71 are rotatably mounted upon the crank pins of said cranks.

The axles carry at their ends the vertical tubes 72 and 73, each forming part of a supporting structure belonging to the respective running wheels 74 and 75. The supporting structure belonging to the running wheel 74 is clearly shown in Fig. 5. In this figure are visible the horizontal axle, the vertical tube 72 and the rod 76 rotatable therein and abutting at the top against the bottom end of the threaded rod 77. This threaded rod 77 may be screwed upwards and downwards within the upper part of the tube 72 by means of the handle 78, whereby the height of the axle above the ground may be adjusted. The running wheel 74 is rotatably mounted in a fork 79 which is pivotally connected to the bottom end of the rod 76 by means of a horizontal pivot 76'. To the fork is also hingedly connected the bottom end of a rod 80 arranged in parallel relation to the rod 76 and carrying at its upper end an adjustable nut 81 which holds a spring 82 in locked position between said nut 81 and a plate 83 rigidly connected to the rod 76. The rod 80 passes through an opening in the plate 83. The tube 72 and the rod 76 constitute the second part of the supporting structure, which part is resiliently connected to the first part of said structure constituted by the fork 79. When the wheel 74 is pushed upwards, whereby the fork 79 turns in the counter-clockwise direction, as viewed in Fig. 5, about the pivot on the rod 76, so that the rod 80 will be pulled downwardly to compress the spring 82. By permitting rotation of the rod 76 in the tube 72 the running wheel 74 is self-adjusting.

For transport the swath turner or the side delivery rake is lifted as a unit from the ground, when the free rotation of the parts 54 and 55 about the coupling axle and the rotation of the rod 53 are rendered impossible and the rods 51 and 52 are moved upwards.

The side delivery rake and swath turner for animal traction according to the invention, which is represented in Fig. 6, has thills 90 pivotable upon an axle 91 which is perpendicular to the plane of the thills and which is connected to a tube 92 to which a tube 93 is perpendicularly secured. The pivoting of the thills 90 relative to the tube 92 about the axle 91 may be prevented, at will, e.g. by introducing a pin through openings in the parts moving with regard to each other. Thereby it is possible to pass from the full line position of the parts 90, 92 to the position 90a, 92a of these parts indicated in dotted lines (Fig. 6), whereby the device changes from a swath turner into a side delivery rake. Simultaneously the axles 94 and 95, which are rotatable about vertical axes with respect to the downwards turned ends of the tubes 92 and 93, have to be brought into new fixed positions. The rake wheels are mounted on the axles 94 and 95 in the same manner as the rake wheels are mounted on the axles in the device shown in Fig. 4. Vertical rods 100 and 101 are mounted on the free ends of the axles and wheels 96 and 97 are secured to said rods by closed brackets 98 and 99.

The rods 92 and 93 may be arranged with a bent part somewhat above the plane of the thills. Since in the working position these rods constitute a rigid whole with the thills, the weight of the device is distributed among both running wheels and the horse or other draft animal. To accommodate a rod carrying a seat may be provided which is e.g. fixed to the tube 93 or bears on the fork of the running wheel 97.

In the illustrated embodiments the axle of the first rake wheel is rigidly connected to the second part of the supporting structure for the running wheel. It will be evident that this connection may also be non-rigid, for instance in the case that the axles of two rake wheels are rigidly connected together and the connecting member is pivotally mounted upon a point of the second part of said supporting structure.

What we claim is:

1. A rake adapted to be connected to a tractor having a power lift comprising a frame having an axle extending substantially horizontally therefrom, a rake wheel journalled on said axle, an arm adjacent said frame having an axle extending from a terminal portion thereof, said axle being substantially parallel to said first mentioned axle, a rake wheel mounted on said second named axle, the opposite terminal portion of said arm being pivotally connected to said frame, and a spring loaded caster wheel connected to said frame.

2. A rake comprising a frame having an axle extending substantially horizontally therefrom, a rake wheel journalled on said axle, an arm adjacent said frame having an axle extending from a terminal portion thereof, said axle being substantially parallel to said first mentioned axle, a rake wheel mounted on said second named axle, the opposite terminal portion of said arm being pivotally connected to said frame, and a spring loaded caster wheel connected to said frame, said frame having a frame member extending over at least one of said rake wheels, means mounting said last-named rake wheel whereby to permit movement in a vertical direction.

3. A raking device as defined in claim 1 wherein said caster wheel is mounted on the rearmost extremity of said frame.

4. A raking device as defined in claim 2 wherein said caster wheel is mounted on the rearmost extremity of said frame.

5. A raking device as defined in claim 1 wherein said frame is located substantially higher than the highest portions of said rake wheels.

6. A raking device as defined in claim 2 wherein said frame is located substantially higher than the highest portions of said rake wheels.

7. A raking device as defined in claim 1 wherein said arm and axle comprise a crank, and resilient means located between said crank and said frame and connecting the same whereby to reduce the pressure of said last named rake wheel upon the ground.

8. A raking device as defined in claim 2 wherein said arm and axle comprise a crank, and resilient means located between said crank and said frame and connecting the same whereby to reduce the pressure of said last named rake wheel upon the ground.

9. The structure of claim 7 wherein the resilient means includes the spring means for said spring loaded caster wheel.

10. The structure of claim 8 wherein the resilient means includes said spring means for said spring loaded caster wheel.

11. The structure of claim 7 wherein said resilient means between said crank and said frame comprises a tension spring, said spring being connected to said crank at a point below said frame.

12. The structure of claim 8 wherein said resilient means between said crank and said frame comprises a tension spring, said spring being connected to said crank at a point below said frame.

13. The structure of claim 7 including means operatively associated with said frame, crank, and said resilient means for adjusting the tension of said resilient means, whereby to support adjustably the weight of said last mentioned rake wheel.

14. The structure of claim 8 including means operatively associated with said frame, crank, and said resilient means for adjusting the tension of said resilient means, whereby to support adjustably the weight of said last mentioned rake wheel.

15. A raking device as defined in claim 1 including coupling means on said frame.

16. A raking device as defined in claim 2 including coupling means on said frame.

References Cited in the file of this patent

UNITED STATES PATENTS

| | | |
|---|---|---|
| 468,382 | Beck | Feb. 9, 1892 |
| 828,571 | Rodemeyer | Aug. 14, 1906 |
| 1,285,963 | Estep | Nov. 26, 1918 |
| 1,421,492 | Kapferer | July 4, 1922 |
| 1,794,630 | Linn | Mar. 3, 1931 |
| 2,459,961 | Pollard | Jan. 25, 1949 |
| 2,618,921 | Riley et al. | Nov. 25, 1952 |
| 2,657,519 | Hill | Nov. 3, 1953 |
| 2,680,343 | Enos | June 8, 1954 |

FOREIGN PATENTS

| | | |
|---|---|---|
| 17,636 | Great Britain | 1900 |
| 411,787 | France | Apr. 19, 1910 |